3,255,250
PROCESS FOR PREPARING TETRAALKYL
THIURAMDISULFIDES
William Budd, Cuyahoga Falls, and Ewald M. Katt, Norton Village, Ohio, assignors to The Goodyear Tire & Rubber Company, Akron, Ohio, a corporation of Ohio
No Drawing. Filed Feb. 21, 1964, Ser. No. 346,492
9 Claims. (Cl. 260—567)

This invention relates to the preparation of tetraalkyl thiuram disulfides, and more particularly concerns an improved process for the nitrite oxidation of an alkali metal dialkyl dithiocarbamate to the corresponding tetraalkyl thiuram disulfide.

Tetraalkyl thiuram disulfides, widely used in the vulcanization of rubber, are conventionally made by oxidizing an alkali metal salt of a dialkyl dithiocarbamic acid. Suggested oxidizing agents have included peroxides, free halogens, hypochlorites, ozone, and various nitrites. Agents other than the nitrites tend to be relatively expensive, difficult to handle, and productive of either low yields, inadequate purity, or both. The art has consequently turned to nitrite oxidation as a route to the tetraalkyl thiuram disulfides.

Although nitrite processes have received much attention, even the best of these presents limitations regarding product yields and purity and, particularly, slow reaction times. Nitrite oxidations are generally conducted at a neutral or slightly acid or alkaline pH, where the reaction requires several hours for completion. Attempts to speed the reaction by reducing the pH have met with difficulty, as an acid medium normally tends to favor the formation of oxidation by-products of no commercial value. An object of the invention is to provide an improved nitrite oxidation process having a materially decreased reaction time but without attendant formation of undesirable by-products.

Most nitrite processes employ an alkali nitrite as oxidant, and theoretically require four equivalents of a mineral acid per mole of product. Half of this is used to convert the alkali metal nitrite to nitrous acid. Another object of the invention is to provide a nitrite process in which it is unnecessary to convert the alkali metal nitrite, thereby halving the consumption of mineral acid.

An important object of the invention is to provide a nitrite oxidation process wherein the nitrite oxidant may be recovered, regenerated, and recycled to the oxidation zone, thereby reducing or eliminating the need for additional nitrites. An ancillary object is to eliminate nitrogen oxide scrubbers and other expensive equipment hitherto used in recovering nitrite oxidants.

Existing nitrite processes are generally unable to produce tetraalkyl thiuram disulfides which are white in color and essentially free of all contaminants. For rubber used in the manufacture of electrical insulation, such purity is essential. A further object is to provide a process for making tetraalkyl thiuram disulfide of such quality.

A practical test of tetraalkyl thiuram disulfide suitability is its ease of dispersion in unvulcanized rubber. Unless the disulfide can dissolve or disperse readily, it is difficult to prepare a homogeneous masterbatch and a uniform vulcanizate. Yet another object is to provide a process for making readily dispersible tetraalkyl thiuram disulfides.

Still another object of the invention is to provide a process for the nitrite oxidation of alkali metal dialkyl dithiocarbamates which is continuous and is characterized by superior control over reaction variables, and the consequent production of higher quality, more uniform, product.

Other and more particular objects and advantages will become apparent as the description of the invention proceeds.

The present invention is based in part on the discovery that excellent product yields and purity and extremely rapid reaction rates, substantially without formation of deleterious by-products, are obtained by utilizing a mixture of nitrogen dioxide ($NO_2$) and nitric oxide (NO) as the oxidant, and by conducting the oxidation at defined conditions. The oxidation reaction zone is maintained at a pH below about four, and the dithiocarbamate reactant and the nitrite oxidant are introduced as a dilute solution into an intensely agitated portion of the reaction zone. This combination of an acid reaction medium and rapid dispersion of reactants provides an environment favoring the immediate oxidation of alkali metal dialkyl dithiocarbamate to the corresponding tetraalkyl thiuram disulfide before any substantial by-product formation occurs.

According to the invention, two streams are introduced into a reaction zone. The first is composed of (a) a dilute aqueous solution of a mineral acid, in an amount adequate to afford acid for the reaction and sufficient to provide a pH in the reaction zone and its effluent of below about four, (b) nitric oxide, and (c) nitrogen dioxide. At least a portion of the zone is intensely agitated, as by a turbine impeller. A second stream, composed of a dilute aqueous solution of alkali metal dialkyl dithiocarbamate, is introduced into the agitated portion where it reacts to form tetraalkyl thiuram disulfide.

According to the preferred embodiment of the invention, nitrogen oxides are regenerated and recycled to the reaction zone. Regeneration, or oxidation of nitric oxide to nitrogen dioxide, may be effected by admixing a molecular oxygen-containing gas such as air or, preferably, oxygen gas with nitrogen oxides recovered from the reaction zone effluent and the mixture cycled back into the zone for reuse.

The following equations describe an overall reaction according to the invention for oxidizing sodium dimethyl dithiocarbamate to tetramethyl thiuram disulfide, using sulfuric acid as the mineral acid:

$$NO + NO_2 \rightleftarrows N_2O_3$$
$$N_2O_3 + H_2O \rightleftarrows 2HNO_2$$

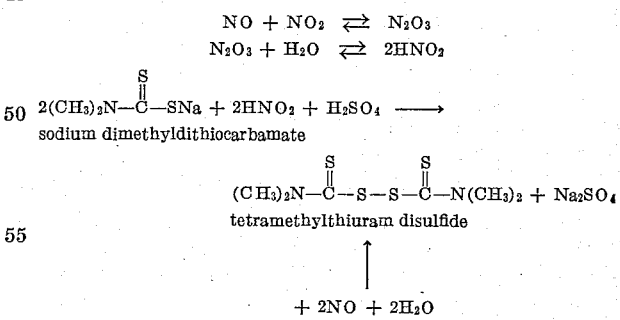

When the nitrite oxidant is regenerated with an oxygen-containing gas, the following additional reaction takes place:

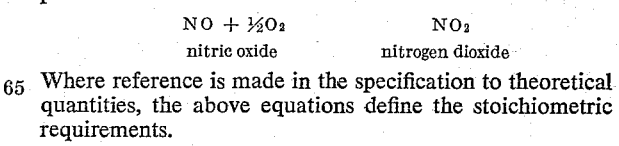

Where reference is made in the specification to theoretical quantities, the above equations define the stoichiometric requirements.

The process of the invention is suitable for oxidizing any of the alkali metal dialkyl dithiocarbamates to the corresponding tetraalkyl thiuram disulfides. Generally, the alkali metal moiety is sodium for reasons of economy, but in particular circumstances may be potassium or the other alkali metals. The dialkyl groups may be the same or different alkyl radicals, generally the lower alkyls having from 1 to about 4 carbon atoms in a primary, secondary, or tertiary configuration. The dimethyl and diethyl reactants are of major interest in the rubber industry, but the di-isopropyl, di-n-butyl, and di-isobutyl reactants have also been suggested. The alkyl groups may be of greater than four carbon atoms in size, illustrated by octyl and decyl.

The presence of a mineral acid is also required for the reaction. Sulfuric acid is the acid of choice, but others such as hydrochloric acid may be substituted in whole or in part for sulfuric acid.

As indicated, two reactant streams are admitted into the reaction zone, the first composed of (a) a dilute aqueous solution of a mineral acid in an amount sufficient to maintain a pH throughout the zone below about 4.0, (b) nitric oxide, and (c) nitrogen dioxide. The second stream is a dilute solution of dithiocarbamate reactant. The concentrations and relative proportions of these streams are not critical but nonetheless are quite important from the standpoint of realizing optimum benefits from the present invention.

Where the mineral acid is sulfuric, it is best used at a concentration of from about 3 to about 20 percent by weight, and in an amount adequate to provide at least about 90 percent (optimally at least about 95 percent) of the theoretical requirement. Higher acid concentrations within the foregoing range tend to favor higher yields and purities, but are rarely necessary in view of the inherently high yield and purity of the present process, and in view of the processing advantages realized by recovering the tetraalkyl thiuram disulfide as a dilute slurry. Further, a very dilute mineral acid solution facilitates the maintaining of a low reaction temperature without the need for internal cooling coils or the like.

Nitrogen dioxide and nitric oxide, that is, the nitrite oxidant, should each be used in an amount corresponding to at least about theoretical, optimally in amounts corresponding to about 10 to about 300 percent in excess of theoretical. When an oxygen-containing gas is employed, it need only be added in the amount theoretically necessary to oxidize nitric oxide to nitrogen dioxide. Any excess oxygen passes into the reaction zone as an insoluble gas.

One of the most striking advantages of the invention is in the reduction of time necessary to achieve substantially complete reaction. The prior art refers to reaction times generally on the order of hours (e.g., British Patent 374,594), but with the present invention the reaction time is usually less than 4 or 5 minutes, and may even be significantly less than 2 minutes, for example about 0.1–0.2 minute. Consequently, the reaction zone need only be a small fraction of the size of prior art reactors, with corresponding savings in equipment investment and maintenance costs.

Reaction zone temperatures may be varied rather widely, and may range from as low as about −20° C. to as high as about 50° C. Preferred reaction temperatures are in the range of about 10 to about 30° C.

A most important variable in reaction system, and the one providing a key to high yields and quality of rapid rates without significant by-product formation, is the maintenance of at least a portion of the reaction zone under intense agitation conditions. Agitation must be rapid enough so that when the solution of dithiocarbamate is introduced into the reactor, the solution will be dispersed and reacted before substantial by-product formation reactions can take place. No precise correlation can be given for the requisite degree of agitation, as this will vary with reactor size and dimensions, but in general the agitation should be so intense that only an insubstantial amount of by-product, for example not more than about 5 percent of reactant, and preferably not more than about 2 percent of reactant, is produced.

Such intensive agitation may be achieved by providing a flat-bladed turbine impeller and by disposing the dithiocarbamate solution introduction conduit as near as possible to the outer periphery of the turbine. Alternatively, both solutions may be introduced as high pressure jets focused at a common juncture.

The tetraalkyl thiuram disulfide product is discharged from a reaction zone in the form of a dilute slurry or suspension in the reaction mixture. It may be recovered by filtration or like solids-liquid separation technique, washed in water and dried to a nearly white product. When tetramethyl thiuram disulfide is being made, its melting point is almost invariably above about 150° C. and is often above about 155° C. A commonly accepted commercial specification for tetramethyl thiuram disulfide is a melting point of not below 142° C.

As the effluent reaction mixture ordinarily contains excess nitrogen oxides, these may be recovered merely by agitating the mixture and collecting evolved gases. Under optimum practice of the invention, these oxides are collected, admixed with makeup nitric oxide and/or nitrogen dioxide (to compensate for system losses) and with regenerant oxygen, and cycled to the dithiocarbamate reaction zone. Oxidation of nitric oxide to nitrogen dioxide proceeds readily at ordinary temperature and pressure with the evolution of heat. No catalyst is necessary, but a trace of water vapor and the presence of a surface catalyst such as activated carbon, silica gel, or alumina gel may be employed if desired (Lohse, "Catalytic Chemistry," page 306, Chemical Publishing Co., 1945).

The invention is further illustrated in the following example, which is descriptive and exemplary but not intended to be wholly definitive with respect to scope or conditions.

*Example*

This example illustrates the continuous preparation of tetramethyl thiuram disulfide by oxidizing sodium dimethyl dithiocarbamate with nitrogen dioxide and nitric oxides in the presence of sulfuric acid.

The reaction zone is defined by a vertically disposed cylindrical reactor having internal dimensions of five inches in diameter, and 6½ inches high; the bottom head is slightly conical in shape, and the resultant reactor has a volume of 0.396 gallon.

An axial impeller extends downward from the top head, terminating in a 6-bladed impeller rotating in a plane 1½ inches above the bottom apex of the conical head. Each blade is square in shape, 1½ inches in each dimension. The outer periphery of the agitator is 3 inches in diameter.

Nitric oxide and nitrogen dioxide and the dilute sulfuric acid solution, the latter termed solution "A," are admitted through an axial conduit at the bottom of the reactor; this conduit is ¼ inch pipe. The second dilute aqueous solution, solution "B," is composed of sodium dimethyl dithiocarbamate and is introduced through a ¼ inch tubing conduit entering the reactor radially at the plane of rotation of the agitator, and extending ⅜ inch into the reactor. A small amount of sodium nitrite is introduced to initiate the reaction but is thereafter discontinued. Product is withdrawn through a one-inch pipe disposed near the top of the reactor and open to the atmosphere.

In the table below, sodium dimethyl dithiocarbamate wt. percent concentration may be obtained by multiplying "weight percent available tetramethyl thiuram disulfide in solution" by 1.192.

Run 1, descriptive of the invention, compares the present process with a corresponding nitrite oxidation process (Runs 2 and 3) wherein nitrogen dioxide is eliminated. The following data are obtained:

TABLE

|  | Run Number | | |
|---|---|---|---|
|  | 1 | 2 | 3 |
| Solution "A": | | | |
| Composition, wt. Percent Sulfuric Acid | 15 | 15 | 15 |
| Charge rate, ml./min | 187 | 166 | 182 |
| Solution "B": | | | |
| Composition, wt. Percent available tetramethyl thiuram disulfide solution | 15.45 | 15.45 | 15.46 |
| Charge rate, ml./min | 391 | 419 | 330 |
| Nitric Oxide charge rate, g./min | 9.3 | -------- | -------- |
| Nitrogen Dioxide charge rate, g./min | 21.1 | 21.9 | 21.5 |
| Residence time of reactants in reactor, minutes | 2.60 | 2.56 | 2.93 |
| Speed of agitator, r.p.m | 1,280 | 1,280 | 1,280 |
| Reaction temperature, °C | 16-32 | 25-31 | 26-30 |
| pH slurry leaving reactor | 2 | 2 | 2 |
| Yield wt. Percent | 76.7 | 49.0 | 59.2 |
| Overall Material Balance, Loss wt. Percent | 1.7 | 6.8 | 5.5 |
| Percent of theoretical Nitric Oxide | 114.2 | -------- | -------- |
| Percent of theoretical Nitrogen Dioxide | 168.8 | 164.4 | 204.8 |
| Percent of theoretical Sulfuric Acid | 116 | 95.9 | 134 |
| Production Rate: lbs. per hr. per gal. reactor volume | 16.7 | 11.4 | 10.9 |
| Product concentration in slurry leaving reactor, wt. Percent | 7.8 | 5.5 | 5.3 |

Thus it is apparent that there has been provided, according to the invention, an outstanding process for oxidizing alkali metal dialkyl dithiocarbamates to the corresponding tetraalkyl thiuram disulfide.

While the invention has been described in conjunction with a particular example thereof, alternatives, modifications, and variations will be apparent to those skilled in the art in light of the foregoing description. Accordingly, it is intended to embrace all such alternatives, modifications, and variations as fall within the spirit and broad scope of the appended claims.

We claim as our invention:

1. A process for the nitrite oxidation of an alkali metal dialkyl dithiocarbamate to the corresponding tetraalkyl thiuram disulfide which comprises:

introducing into a reaction zone (a) a dilute aqueous solution of a mineral acid, in an amount sufficient to maintain the pH of said reaction zone and of the effluent from said zone below about four, (b) nitric acid, and (c) nitrogen dioxide;

maintaining at least a portion of said reaction zone under conditions of intense agitation to thereby provide an environment favoring oxidation of said alkali metal dialkyl dithiocarbamate to tetraalkyl thiuram disulfide without substantial by-product formation;

introducing into the intensely agitated portion of said reaction zone a dilute aqueous solution of said alkali metal dialkyl dithiocarbamate;

and withdrawing from said reaction zone an effluent containing said tetraalkyl thiuram disulfide.

2. Process of claim 1 including the steps of separating nitrogen oxides from said reaction zone, admixing therewith a molecular oxygen containing gas, and cycling the mixture to the reaction zone.

3. Process of claim 1 wherein said process is conducted continuously.

4. Process of claim 1 wherein said alkali metal dialkyl dithiocarbamate is a sodium di-lower-alkyl dithiocarbamate.

5. Process of claim 4 wherein said sodium di-lower-alkyl dithiocarbamate is sodium dimethyl dithiocarbamate.

6. Process of claim 1 wherein said mineral acid is sulfuric acid.

7. Process of claim 6 wherein said sulfuric acid is employed at a concentration of from about 3 to about 20 percent by weight and in an amount corresponding to at least 90 percent of theoretical.

8. Process of claim 1 wherein the reactants are maintained in said reaction zone for a period of time of from about 0.1 to about 4 minutes.

9. Process of claim 1 wherein the pH of the effluent from said reaction zone is maintained at about 2.

No references cited.

CHARLES B. PARKER, *Primary Examiner.*
ROBERT V. HINES, *Assistant Examiner.*